United States Patent [19]

Yuen

[11] Patent Number: 5,512,738
[45] Date of Patent: Apr. 30, 1996

[54] CODED SEAL

[75] Inventor: Ki S. Yuen, Brampton, Canada

[73] Assignee: International Verifact Inc., Toronto, Canada

[21] Appl. No.: 374,022

[22] Filed: Jan. 18, 1995

[30] Foreign Application Priority Data

Oct. 20, 1994 [CA] Canada ................................. 2133902

[51] Int. Cl.⁶ ................................ G06K 5/00; G06F 7/04
[52] U.S. Cl. ......................... 235/382; 235/379; 340/541; 340/825.32
[58] Field of Search ..................... 235/379, 380, 235/382; 156/442; 292/317; 361/654; 340/533, 534, 541, 590, 572, 825.32

[56] References Cited

U.S. PATENT DOCUMENTS

| | | | |
|---|---|---|---|
| 1,578,980 | 3/1926 | Gasser | 340/590 |
| 3,367,175 | 2/1968 | Morreal et al. | 73/86 |
| 3,972,039 | 7/1976 | Marshall | 340/508 |
| 4,101,052 | 7/1978 | Dove | 229/23 R |
| 4,359,903 | 11/1982 | Crotzen et al. | 73/602 |
| 4,835,524 | 5/1989 | Lamond et al. | 340/572 |
| 5,120,097 | 6/1992 | Fattori et al. | 292/318 |
| 5,268,669 | 12/1993 | Roskowski | 340/534 |
| 5,311,450 | 5/1994 | Ojima | 340/541 X |
| 5,364,141 | 11/1994 | King | 292/318 |
| 5,369,548 | 11/1994 | Combs | 361/654 X |

*Primary Examiner*—Donald T. Hajec
*Assistant Examiner*—Jeffrey R. Filipek

[57] ABSTRACT

The present invention is directed to a coded seal which allows a device to determine whether unauthorized access to a terminal or other electronic or security device has been made. The code includes a series of continuous and discontinuous members which are used to form a code. Breaking of the seal causes the members to be discontinuous and makes it difficult to determine what the code was. In this way, it is difficult to replace the seal, as this would only be successful if the replacement seal had the same code.

21 Claims, 4 Drawing Sheets

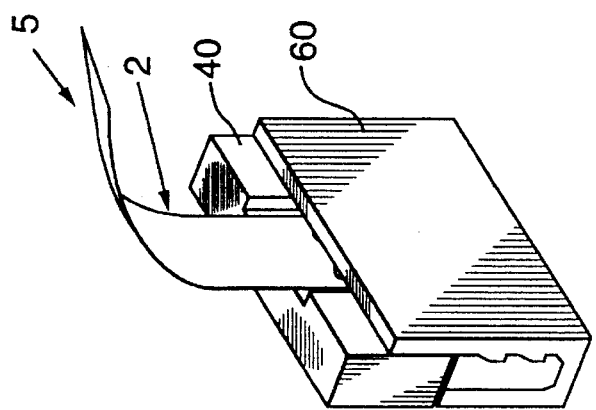
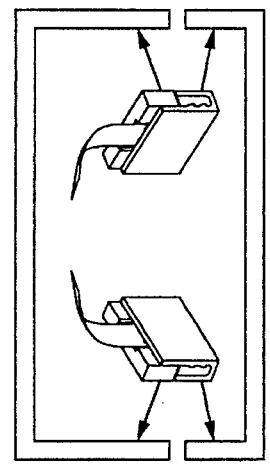
FIG. 7
FIG. 8
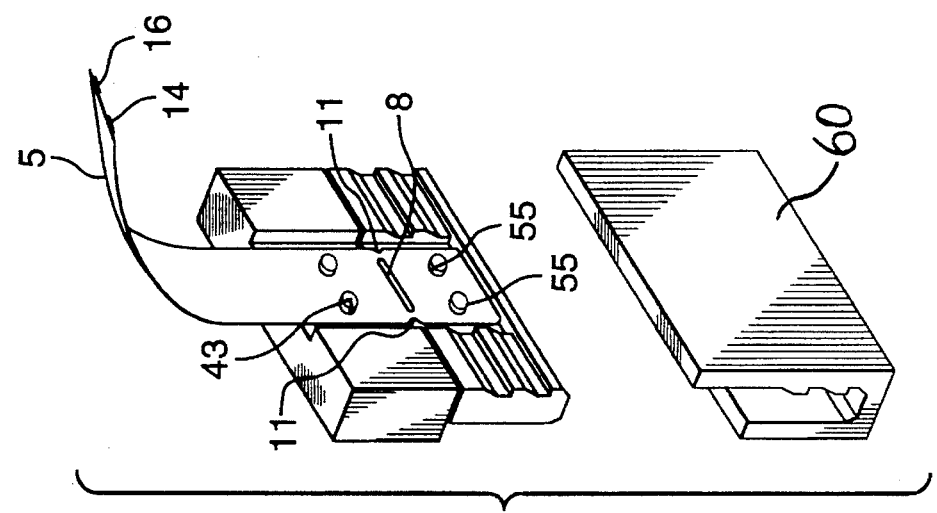
FIG. 6.
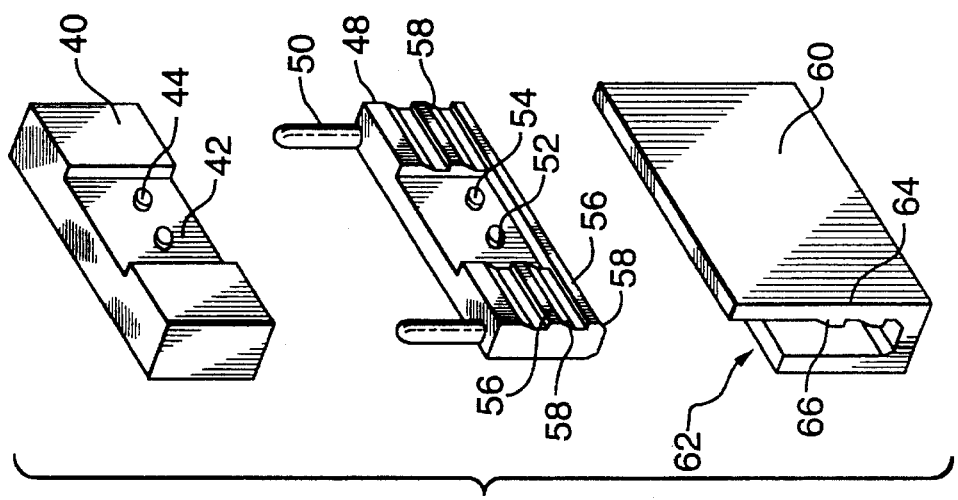
FIG. 5

CODED SEAL

FIELD OF THE INVENTION

The present invention relates to coded seals and in particular is directed to a seal which can be used in combination with a logic arrangement to determine when a breach in security of an electronic component has occurred.

BACKGROUND OF THE INVENTION

Seals have been used over the years for providing a positive indication that the contents of the container or casing have not been tampered with. Many of these seals are merely adhesive seals which typically must be ripped to open the container, however, in other cases, such as electronic components, various electrical switches and/or magnetic devices have been used to provide a positive indication that the security of the device has been violated. More sophisticated electronic seals typically include a switch arrangement and have not proven entirely satisfactory. The switch type devices normally provide a signal to the device that a breach has occurred. This is important in many devices where the warranty may be void if the device has been tampered with. For other applications, a mere positive indication that a breach has occurred is not sufficient, as a more important aspect may be to render the device inoperative if the contents have been violated. For example, in some devices an unauthorized breach may indicate a fraudulent activity. This would be the case for automatic teller machines and financial transaction terminals, such as terminals for processing credit cards, charge cards and/or debit cards.

A further problem with the existing systems is that it is often easy to circumvent and/or replace the tamper indicating device.

SUMMARY OF THE INVENTION

A tamper indicating seal, according to the present invention, comprises a substrate having at least three frangible conductors coded by having some of the conductors continuous and some of the conductors discontinuous. The substrate and the conductors cooperate to form a tear region which tears when the seal is stressed and causes the continuous conductors to break. With this seal arrangement, an electrical device with a logic arrangement can interrogate the seal and confirm the code is the same code as the previously recorded code. Essentially, the microprocessor initially establishes the number and position of the continuous and discontinuous conductors. Should the seal be broken when the terminal is off, the mere replacement of the seal is only effective if it has the same code. Preferably, the seal is designed to disguise a conductor which was discontinuous originally from a conductor which became discontinuous due to tearing of the seal.

In a preferred embodiment, the substrate of the seal has a weakened zone positioned to cause the seal to tear at the weakened zone when appropriately stressed. Discontinuous conductors are discontinuous at the weakened zone.

In a preferred embodiment, the weakened zone includes a cutout portion extending generally across the conductors.

Coding of the conductors is most effective when more conductors are provided. For example, a system having eight conductors has proven quite effective.

In yet a further aspect of the invention, the conductors pass through the weakened tear region twice and are in closely spaced proximity such that it is difficult to reestablish the code.

The seal is advantageously used in combination with an electrical device, where the device has an outer two-part split casing. The seal is secured to both parts of the split casing, with the weakened zone therebetween and interior to the casing. The seal then tears through the weakened zone when the parts of the housing are split apart. The seal is electrically connected to a number of connection points in the electrical device to establish which conductors are continuous and which conductors are discontinuous, or at least to establish a code defined by the continuous and discontinuous.

According to yet a further aspect of the invention, a debit or credit card terminal for reading of information on a card and carrying out the credit or debit of an account associated therewith has a split housing for the terminal enclosing electrical components and logic software of the terminal which are not to be tampered with. The terminal includes a seal comprising substrate having at least three frangible electrical leads defining a code by having some of the leads continuous and some of the leads discontinuous. The substrate and the leads cooperate to form a tear region, which tears when the seal is stressed and causes the continuous leads to break. The seal is secured to the split housing to be stressed and tear in the tear region when the housing is split. The terminal is electrically connected to the seal to initially read the code and retain the code, and thereafter to read the code from time to time and alter the operation of the terminal whenever the read code is not the same as the retained code. Preferably, the terminal would shut down at this time, at least with respect to carrying out financial transactions, and may send out an alert signal of a possible breach in security or fraudulent activity.

The debit or credit card terminal preferably has a seal with at least six electrical leads to render the code more difficult to determine and less probability of merely stumbling upon the code. The preferred aspects with respect to the seal, as generally described above, can also be used with the debit or credit card terminal.

BRIEF DESCRIPTION OF THE DRAWINGS

Preferred embodiments of the invention are shown in the drawings, wherein:

FIG. 5 is a schematic view showing one method for attaching of the seal;

FIG. 6 shows the seal attached to one component about to be inserted in a second component;

FIG. 7 shows the components of FIG. 6 in an assembled manner;

FIG. 8 shows two seals secured either side of a split casing;

DETAILED DESCRIPTION OF THE PREFERRED EMBODIMENTS

Figure 1:
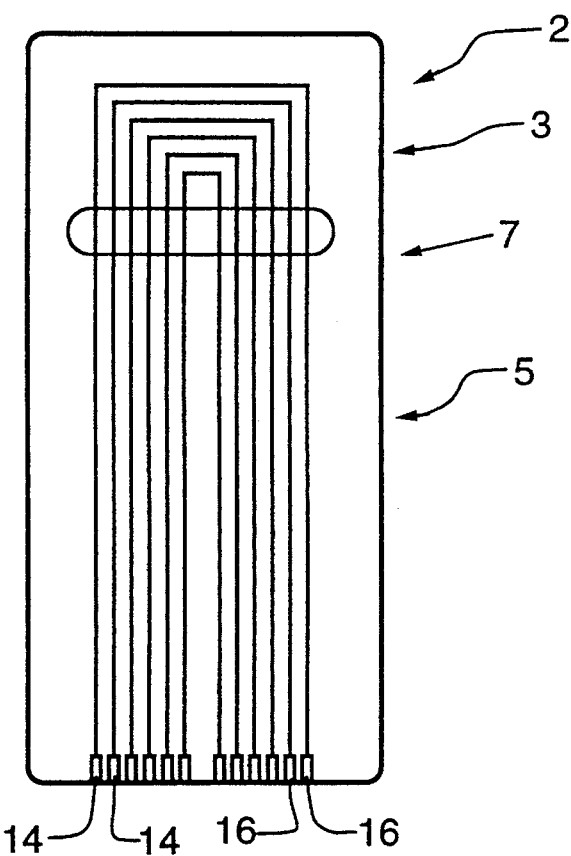
FIG. 1 is a schematic view of the coded seal.

A tamper indicating seal 2, shown in FIG. 1, has a flexible substrate 4, which is preferably part of a flat, flexible electrical connector. This substrate is an insulating material and has thereon a plurality of conductors or leads, indicated as 6. The substrate includes a window or weakened zone, generally indicated as 8, which extends across the conductors or leads 6 and defines a tear region 7 through the weakened zone 8. Tearing of the seal will sever all of the conductors or leads 6 when the seal is torn. The failure of the seal due to improper access of a device also causes distortion and displacement of the conductors.

The seal 2 has a first portion 3 to one side of the tear region and a second portion 5 to the other side of the tear region. The first region can be connected to one part of a split casing and the second portion connected to the adjacent part of a split casing. Separation of the halves of the casing will result in tearing of the tear region. It is possible to provide notches adjacent the weakened zone 8 to accommodate initiation of a tear when the seal is stressed.

The conductors 6 are preferably electrical connectors and are shown crossing the weakened zone twice. Each conductor has a first connection point 14 and a second connection point 16 at the free end of second portion 5. These connections 14 and 16 allow the seal to be in communication with a microprocessor or other logic circuitry within the terminal or electrical equipment in which the equipment is being installed.

Figure 2:
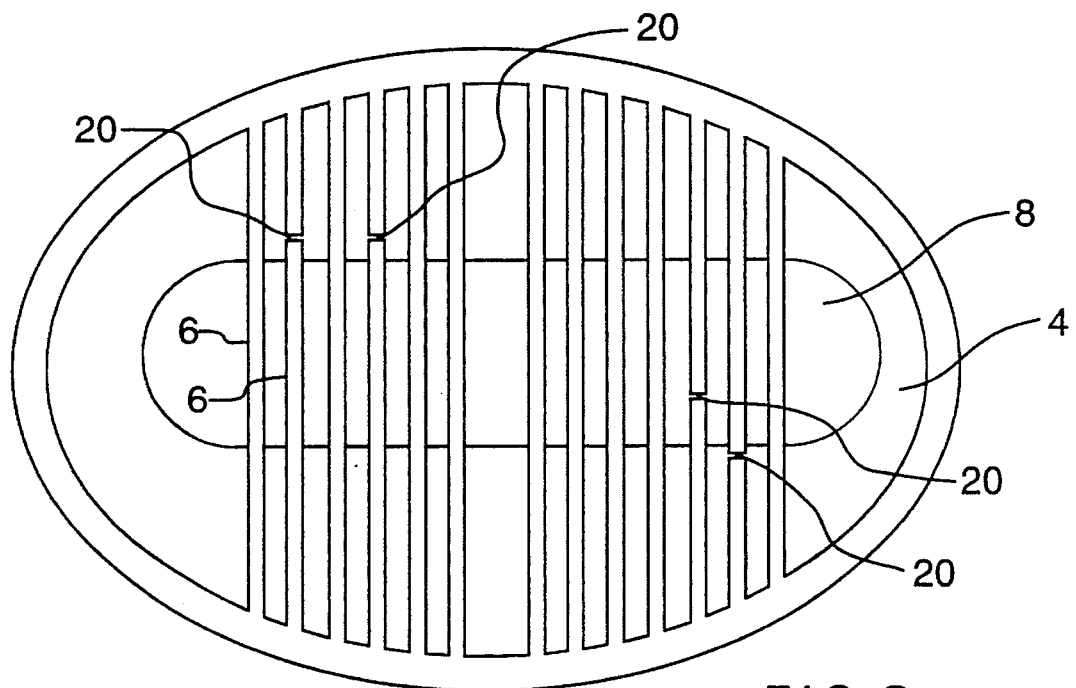
FIG. 2 is an enlargement of the weakened area of the seal.
Figure 3:
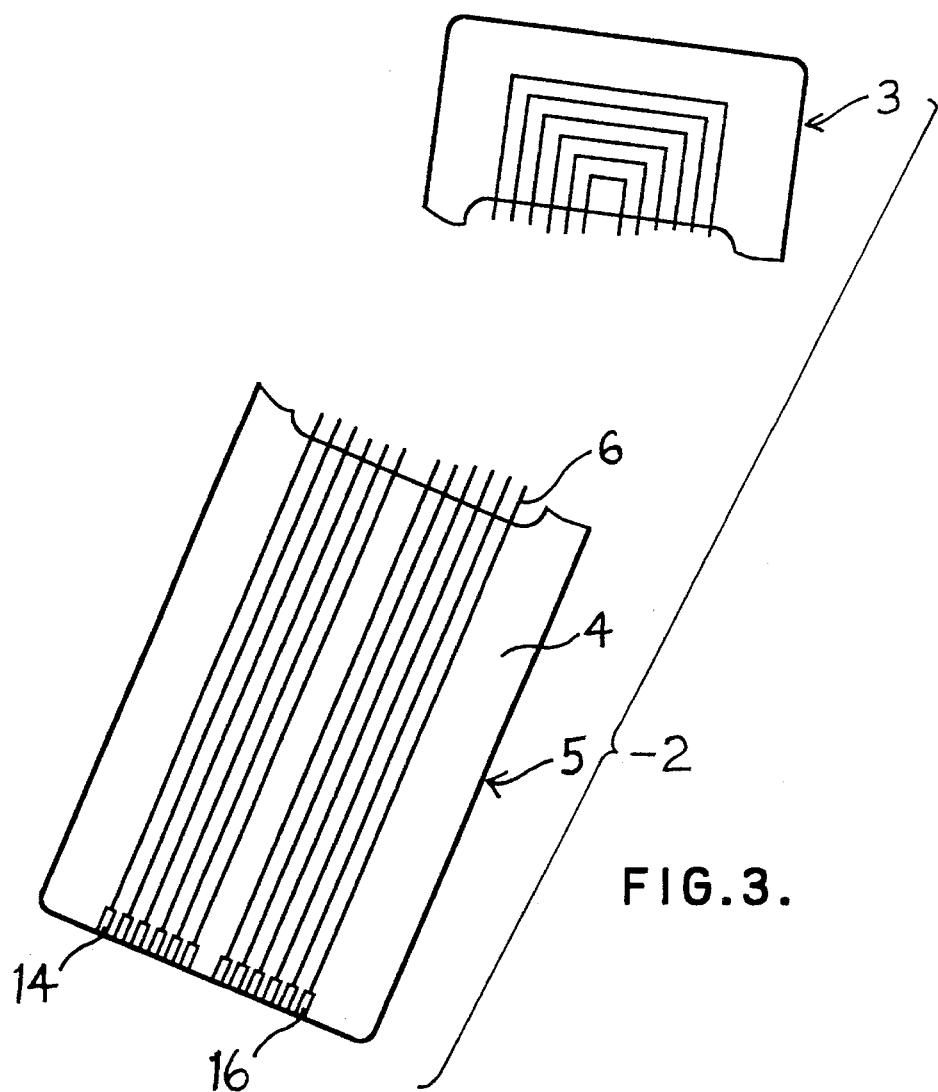
FIG. 3 shows the seal when broken.

In FIG. 1, six electrical leads or conductors are shown and some of these leads are not continuous between connections 14 and 16. Some of the leads 6, as clearly shown in FIG. 2, are severed in or generally adjacent the weakened zone 8, which in this case is shown as a cutout portion. The seals can be made with these breaks 20 provided in different locations and the number of breaks can also be varied. In this way, each seal has its own code or lock combination. Once the seal is installed, the electrical device can determine the code of the seal and retain the code in memory. During operation, the electrical device, from time to time, can reevaluate the seal and if the code has changed, then the device can take appropriate action. The appropriate action in many cases will result in the device being inoperative. The device prior to shutdown can also be programmed to send an alarm signal or warning to the remote computer. A broken seal is shown in FIG. 3 and it can be seen that the seal was torn through the weakened zone 8. By providing the severed connectors adjacent the weakened zone, it is difficult to determine what leads were broken due to being stressed and what leads were previously broken as part of the code. Therefore, if a person was to reinstall a further seal, they would be unsure of the code of the original seal and the probability of guessing the exact code is not that high. Obviously, the probability decreases as the number of electrical conductors or leads increases.

Figure 4:
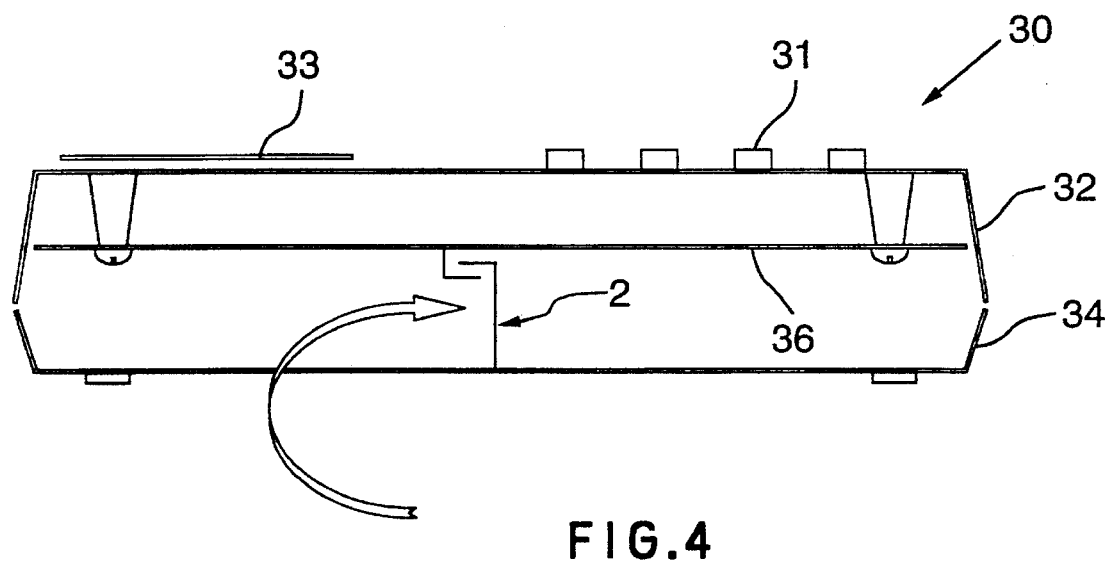
FIG. 4 is a side elevation of a financial transaction terminal.

This type of seal is particularly valuable for transaction terminals (i.e. terminals which process charge card credit cards, banking cards, debit cards and/or security access cards), as generally indicated in FIG. 4, although it is not limited to this precise application. The transaction terminal 30 has a keypad 31 and a display 33, with the terminal having a housing comprising a first casing 32 and at least a second casing 34. In the sectional view of FIG. 4, the seal 2 is shown attached to the lower casing 34 and is also attached to a circuit board 36 secured to the upper casing 32. To gain access to the interior of the transaction terminal, it is required to separate the two casings, 32 and 34 and this will result in rupture of the seal 2 across the weakened region. The various connections 14 and 16 are connected to the circuit board 36 and a microprocessor of the terminal can interrogate the seal from time to time. In financial terminals or transaction terminals, it is not desirable to allow access to the interior of the terminal and to detect unauthorized access.

Tampering of a terminal could result in vital security information being made available to unauthorized persons without the system or the user realizing a breach in security has occurred. The SMART™ seal 2 allows software or hardware of the transaction terminal to affect interrogation of the seal from time to time and if the seal has been replaced, the probability of the replacement seal having the original code is low. This then allows the terminal to realize that a breach has occurred and take appropriate action, such as sending a signal to a host computer or merely shutting down the terminal or other appropriate action to protect innocent parties and capture the unauthorized party. The terminal can include memory means for maintaining knowledge of the original code and only operating when the code resulting from the interrogation is the same the original code. Certain important information can be erased if a seal is broken. The breaking of a continuous conductor can be used to trigger this result.

FIGS. 5 through 8 show additional details and a preferred method of securing of the seal between two parts of a casing.

In FIG. 5, one part of a casing has been shown as 40 and includes a seal engaging slot 42 with pins 44 provided therein for engaging apertures 43 provided in the seal 2. This provides positive securement of the seal to one part of an at least two-part casing. A separate slide member 48 has guide pins 50 which are received in ports in the first part of the casing 40. These pins serve to align the slide member with component 40. Slide member 48 also includes a seal engaging slot 52 having securing pins 54 which project through ports 55 in the seal and affect a connection of the seal to the slide member. The slide member, at a lower edge, includes locking ridges 56 in combination with cam surfaces 58.

The slide member 48 is received in a slot 62 of a second part of a casing, with this second part generally indicated as 60. The slot 62 includes locking ridges 64 and cam surfaces 66 to cooperate to allow insertion of the slide member into the slot 62 and to retain this member in the slot once so inserted. The assembled arrangement is generally shown in FIG. 7. In FIG. 7, it can be seen that the casings 40 and 60 have the seal 2 retained therebetween and separation of the two casings 40 and 60 will result in tearing of the seal through the weakened region 8. It can be seen that at either side of the seal, shown in FIG. 6, notches 11 allow tearing or initiation of a tear through the weakened region 8. This will rupture and distort the conductors, and in so doing, make it very difficult to identify the original code of the seal. The second portion 5 of the seal 2 is in securement with casing 40 and the free end thereof with the connections 14 and 16 are brought into engagement with the circuit board. It can be seen that a two-part casing in FIG. 8 for a terminal is shown and two seals are provided to opposite sides of the casing. Note, with this arrangement, two connections with the circuit board are provided, and in effect, two separate combinations or coded seals are defined. The transaction terminal can obviously operate on the broad concept that any change in either code will result in the unit concluding that a breach has occurred.

The seal arrangement can be subdivided into a series of seals, each having a small number of conductors, however, from a manufacturing and an installation point of view, the conductors are preferably combined into a larger group.

This seal has been specifically described with respect to financial transactional terminals, but it can be appreciated that it can apply to other electrical devices where it is desirable to allow detection of entry into the casing and making it much more difficult for the unauthorized replacement of the seal to result in the terminal continuing to operate in a normal manner. The seal is simple to install, inexpensive to produce and is inexpensive to interrogate. The general principles used in this seal can also be used with other types of conductors, such as optical fibers.

Figure 10:
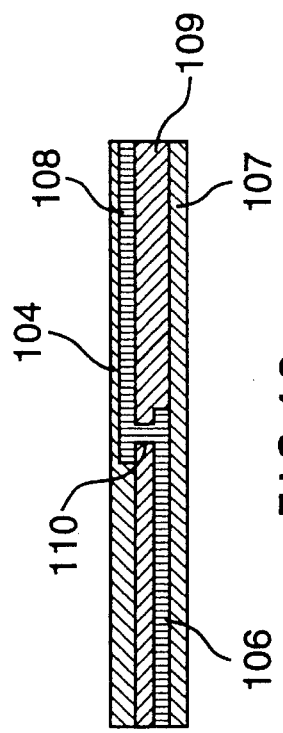
FIG. 10 is a cross section at A in FIG. 9.
Figure 11:
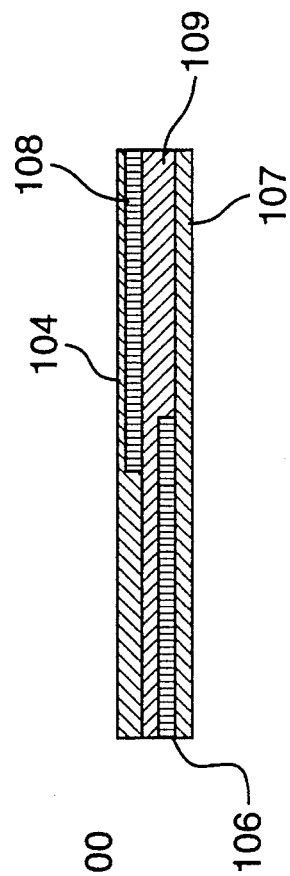
FIG. 11 is a cross section at B in FIG. 9.
Figure 9:
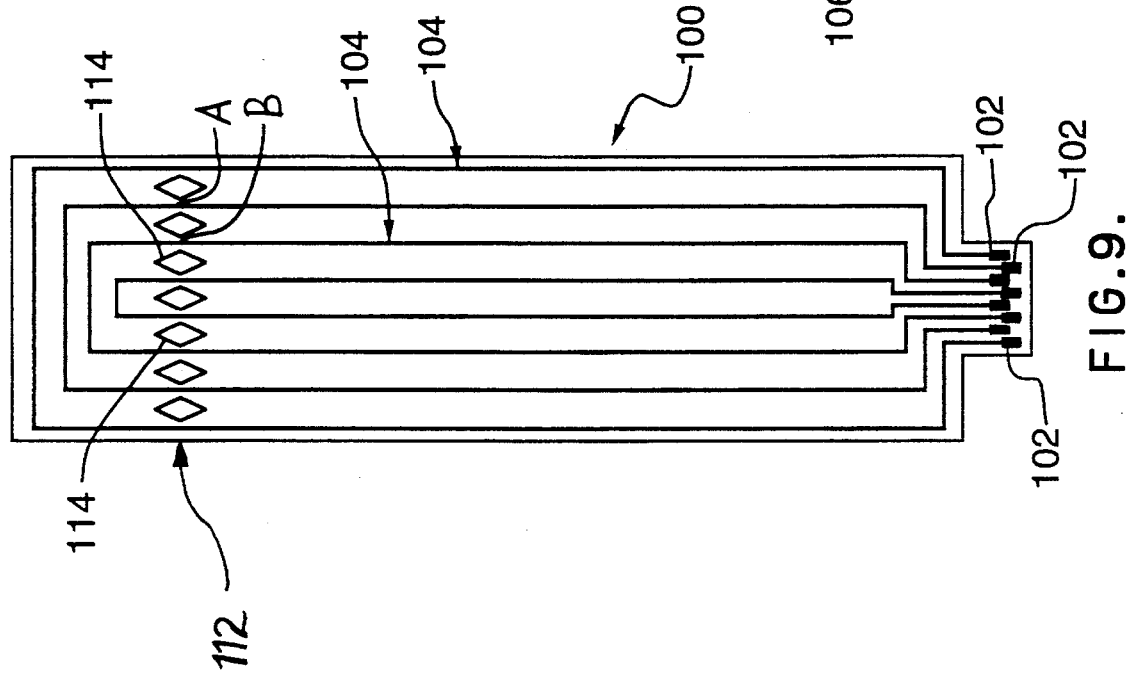
FIG. 9 is a top view of an alternate arrangement.

The alternate embodiment of FIGS. 9 through 11 uses a multilayer structure 100 of the type used in flexible printed circuits. In fact, multilayer structure 100 is a flexible circuit having connection points 102 connected to a broken or conductive loop 104.

The cross sections of FIG. 10 show how the conductive loops 104 have a segment 106 provided on a bottom layer polycarbonate support layer 107 and a segment 108 provided on the upper surface of dielectric layer 109. Segments 106 and 108 preferably overlap, as shown in FIGS. 10 and 11. In the case of conductive loop 104 of FIG. 10, a hole aligns segments 106 and 108 and a conductive bridge 110 connects the segments. In contrast, a nonconductive loop 104 of FIG. 11 is shown. With this arrangement, it is difficult to visually detect which loops are conductive and when the multilayer structure tears through weakened zone 112 (having tear holes 114), the code is difficult to decipher. It can be appreciated two conductive bridges provide a conductive loop, whereas a nonconductive loop can have zero or one conductive bridge.

The segments 106 and 108 and conductive bridge 110 are of conductive silver ink. The bridge is automatically formed in printing the segment 108, as the ink fills any holes in the dielectric material 109.

The multilayer flexible printed circuit structure 100 can be economically produced using printing techniques for forming the segments. The hole in dielectric layer 109 is also easily formed. Therefore, the alternate structure of FIGS. 9 through 11 is believed to more effectively mask which conductors were conductive and which conductors were not conductive when the seal is broken. The seal is also easier to manufacture.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A seal comprising a substrate having at least three frangible conductors coded by having some of said conductors continuous and some of said conductors discontinuous, said substrate including a tear region which tears when said seal is stressed and causes said continuous conductors to break.

2. A seal as claimed in claim 1 wherein said substrate has a weakened zone positioned to cause said seal to tear at said weakened zone when appropriately stressed, and wherein said discontinuous conductors are discontinuous at said weakened zone, and wherein said conductors traverse said weakened zone.

3. A seal as claimed in claim 2 wherein said weakened zone includes a cutout portion extending generally across said seal.

4. A seal as claimed in claim 3 wherein said at least 3 conductors is at least 8 conductors.

5. A seal as claimed in claim 4 wherein each of said conductors has a first electrical connection at one end of said conductor and a second electrical connection at an opposite end of said conductor, and said conductors extend through said cutout portion at least twice in joining said first and second electrical connections which are located adjacent one end of said seal.

6. In combination a seal as claimed in claim 5 and an electrical terminal having an outer two part split casing, said seal being secured to both parts of said split case housing with said weakened zone therebetween and interior to the casing, said seal tearing through said weakened zone when said parts of said housing split apart.

7. An electrical device having a split casing and a tamper indicating seal attached to said casing to sever when said casing is split; said seal comprising a substrate having at least three frangible conductors defining a code by having some of said conductors continuous and some of said conductors discontinuous, said substrate and said conductors cooperating to form a tear region which tears when said seal is stressed and causes said continuous conductors to break; said electrical terminal being connected to said conductors and including means to electrically read the code by distinguishing which conductors are continuous and which conductors are discontinuous and means for retaining the read code, said terminal at particular points in time having said read means read the code and compare the read code with the retained code, and logic means to cause said terminal to function in a normal manner only as long as the read code is the same as the retained code.

8. An electrical device as claimed in claim 7 wherein said device operates to read said code at least when the device is turned on.

9. An electrical device as claimed in claim 7 wherein said seal has at least 6 conductors.

10. An electrical device as claimed in claim 9 wherein said seal is secured across the split housing and includes logic for transmitting an signal if the retained code and the read code are different and will not allow the normal transactions of the device to be carried out.

11. A debit or credit card terminal for reading of information on a card and carrying out the credit or debit of an account associated therewith, said terminal having a split housing enclosing electrical components and logic software which are not to be tampered with, said terminal including a seal comprising a substrate having at least three frangible electrical leads defining a code by having some of said leads continuous and some of said leads discontinuous, said substrate and said leads cooperating to form a tear region which tears when said seal is stressed and causes said continuous leads to break, said seal being secured to said split housing to be stressed to tear in said tear region when said housing is split, said terminal being electrically connected to said seal to initially read said code and retain said code and thereafter to read said code from time to time and alter the operation of the terminal whenever the read code is not the same as said retained code.

12. A debit or credit card terminal as claimed in claim 11 wherein said seal has at least 6 electrical leads.

13. A debit or credit card terminal as claimed in claim 12 wherein the discontinuous leads of said seal are discontinuous in said tear region.

14. A debit or credit card terminal as claimed in claim 13 wherein said continuous leads sever and distort in said tear region when said seal is torn.

15. A tamper indicating seal comprising a plurality of frangible electrical conductors carried on a substrate, said substrate having an intermediate weakened region through which said electrical conductors traverse, said intermediate weakened region being designed to sever when a tensile force is exerted across said weakened region wherein said plurality of electrical conductors comprise at least three conductors and at least one of said conductors is broken to form a code of broken conductors and continuous conductors.

16. A tamper indicating seal as claimed in claim 15 wherein said at least one broken conductor is broken adjacent said weakened zone.

17. A tamper indicating seal as claimed in claim 16 wherein said continuous conductors cooperate with said substrate to fracture adjacent said weakened region when said seal is broken.

18. A tamper indicating seal as claimed in claim 17 wherein said substrate is of a plastic material.

19. A tamper indicating seal as claimed in claim 18 wherein said plastic substrate includes a notch at an edge of said substrate adjacent said weakened region to facilitate initiation of a tear through said weakened region when said seal is stressed in a manner to cause failure thereof.

20. A tamper indicating seal comprising at least three code carrying members extending through a tear zone located between a first securing portion and second securing portion, some of said code carrying members being continuous and some of said code carrying members being discontinuous producing a predetermined code of continuous and discontinuous code carrying members; said seal, when tensioned between said first securing portion and said second securing portion, failing at said tear zone and causing all conductors to be discontinuous thereby destroying the predetermined code; and means associated with said code carrying members for connecting said seal with a device and causing said predetermined code to be available to the device.

21. In an electrical device having two separable components held in a secured manner and not intended to be separated by nonauthorized personnel, the improvement comprising a coded seal arrangement secured to and extending between said two separable components, said seal arrangement having a plurality of code carrying frangible members, some of which are continuous and some of which are discontinuous, said code carrying frangible members collectively defining a predetermined code; said seal, when stressed due to separation of said separable components, failing and destroying the code by separating into two parts and rendering code carrying members discontinuous; said seal arrangement being in communication with said electrical device to transfer the code of the seal arrangement thereto, and wherein said electrical device interrogates said seal arrangement from time to time to confirm the code remains unchanged and alters the operation of the device if the code has changed.

* * * * *